Nov. 17, 1953     A. M. HALEY     2,659,779
APPARATUS FOR CONTROLLING THE MOVEMENT
AND STOPPING OF A BAND OF MATERIAL
Filed June 2, 1947     6 Sheets-Sheet 3

Inventor
Allan M. Haley
By Lyon & Lyon
Attorneys

Nov. 17, 1953  A. M. HALEY  2,659,779
APPARATUS FOR CONTROLLING THE MOVEMENT
AND STOPPING OF A BAND OF MATERIAL
Filed June 2, 1947  6 Sheets-Sheet 5

Inventor
Allan M Haley
By Lyon & Lyon
Attorneys

Patented Nov. 17, 1953

2,659,779

UNITED STATES PATENT OFFICE 2,659,779

APPARATUS FOR CONTROLLING THE MOVE-
MENT AND STOPPING OF A BAND OF MA-
TERIAL

Allan M. Haley, Los Angeles, Calif., assignor of
twenty-five per cent to Kenneth L. Stout and
twenty-five per cent to Kenneth Krumpholz,
both of Los Angeles, Calif.

Application June 2, 1947, Serial No. 751,657

8 Claims. (Cl. 200—5)

This invention relates to an apparatus for controlling the movement of a band of material and accurately stopping the movement of that band of material at a multiplicity of selectable stopping points. The invention also relates particularly to an apparatus for projecting film on a screen and refers particularly to an apparatus which includes a control mechanism by which, in response to an operation of the keyboard, a selected frame of a film may be brought to a stop and held at the projector gate so that such selected frame of film may be automatically positioned in response to the keyboard mechanism.

The invention also relates to mechanism by which, in combination with further controls of the keyboard, a particular area of the scene thus projected on a screen may be selected for view.

The apparatus of the present invention is generally useful for automatically and rapidly selecting a particular specimen of data or information from a large mass of similar data when such data has been correlated to a number system, it being required only with the mechanism of the present invention that the operator set on the keyboard the particular number corresponding to the particular specimen of data or information desired, whereupon the machine automatically operates to move in front of the lens system of a projector a section of film upon which such data is placed for projecting such film upon a viewing screen and automatically indicates on such screen the particular area of the scene projected bearing the particular information corresponding to the number set up on the keyboard. Machines of the type of the present invention are useful, for example, in connection with mathematical tables where, for example, it has been previously required for the use of such tables to locate such information in a large table by manually opening the table to the right page and then scanning the page to find the particular location thereon bearing the information in question.

In accordance with the present invention each page of such mathematical table is photographed and becomes one frame of a film similar in physical construction to a motion picture film. An operating mechanism is provided by which, through a keyboard system the projecting mechanism may be operated to automatically bring any particular frame of the film into registry of the lens system of the projector and also, where desired, the mechanism is provided where, in response to further keys, a particular area of the scene projected is marked off for observation, thus reducing the work in using mathematical tables merely to the punching of a number. Where, for example, trigonometric functions are required one is required only to set up on the keyboard the angle in degrees, minutes and seconds for which the trigonometric function is required and the machine of the present invention automatically moves the correct frame of film containing the trigonometric functions in question in the proper positions in the projecting machine so that such film may be projected on the screen and, moreover, an indicating member moves over the screen to point out the specific area of the screen where the trigonometric function is indicated for the particular seconds of the angle involved.

The apparatus of the present invention has many other uses. As a further example it may be used for quickly locating credit information of customers by providing a number corresponding to each customer and photographing on a separate frame of the motion picture film the information corresponding to each customer. The machine will automatically display this information in response to setting up such number on the keyboard of the apparatus.

It is therefore the general object of the present invention to provide an apparatus by which a particular frame of a continuous film may be automatically brought in response to the actuation of the keyboard into proper position to be projected upon the screen.

It is a further object of the present invention to provide a machine with further mechanism which, in response to further keys of the keyboard, a particular area of the screen may be marked out.

A further object of the present invention is to provide a mechanism for selecting a particular frame of a continuous film to be projected, which mechanism is selectively responsive to the setting of a key number on the keyboard having as many as four separate digits for selecting the particular film to be projected and which mechanism is further responsive to the action of other numbers for automatically indicating on the screen a particular area in question.

The apparatus of the present invention, together with various further objects and advantages of the present invention, will be fully understood from the following description of a preferred form of the apparatus embodying the invention. The description is given in connection with the accompanying drawings in which:

Figures 1, 2, 3:
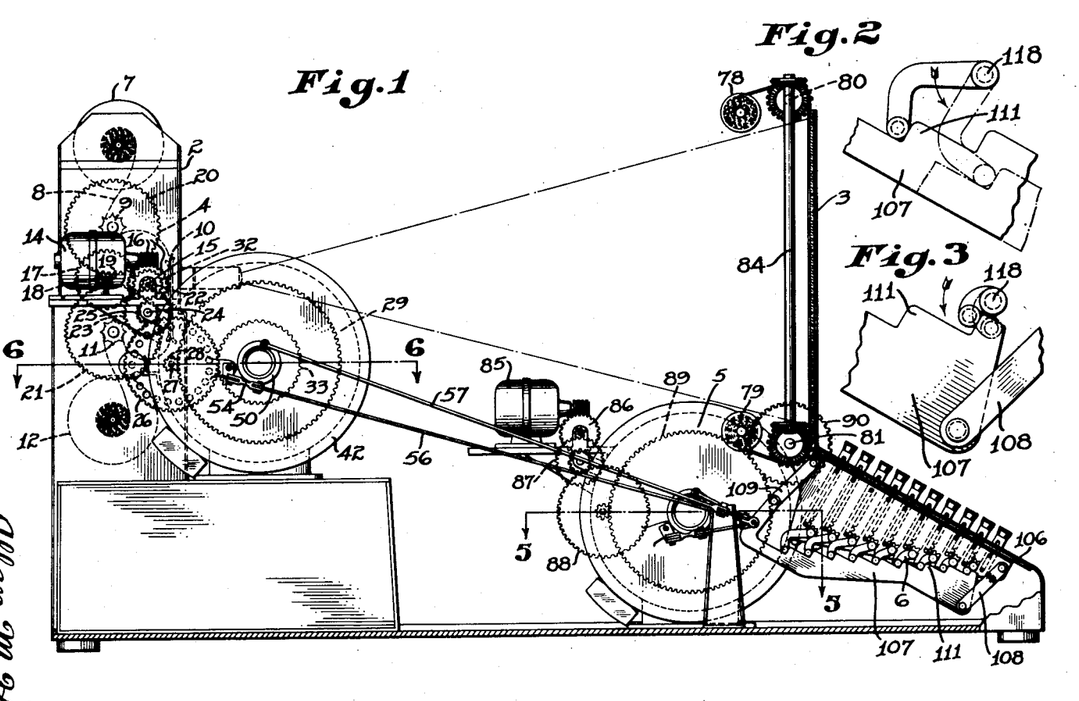
Figure 1 is a partially diagrammatic view in side elevation.
Figure 2 is a fragmentary view illustrative of the pawl action of the No. 9 key.
Figure 3 is a similar view of the action of the No. 1 key.

Referring first mainly to Figure 1 of the drawings, the apparatus includes as major components a projector 2 for projecting film on a screen 3, a mechanism 4 for controlling the movement of film through the projector and stopping the film to permit display of a selected frame of the film, a mechanism 5 for actuating a mask movable relative to the screen 3 and a keyboard mechanism 6 for controlling the mechanisms 4 and 5.

The projector 2 may be of any usual or preferred type of projector designed for projecting frames of a motion picture and is but diagrammatically illustrated. Such a projector will include a reel 7 upon which one end of a motion picture film 8 is wound. The motion picture film passes from the reel 7 over a driving sprocket 9 through a gate 10 to a second driving sprocket 11 as its opposite end is wound around a reel 12. The motion picture film 8, which is positioned within the projector 2, may have various different types of information photographed on the individual frames of the film depending upon the particular service for which the machine is intended. Merely for illustration I have shown the invention designed for the purpose of displaying the information embodied in a large table of trigonometric functions, in which table the trigonometric functions are given to nine places and in which table there is provided a separate page of information for each angle of one minute. In order that the machine may be adapted for displaying the information of such a table each separate page of the table is photographed and made a separate frame of the motion picture film 8, the frames being arranged on a film consecutively in the order of the pages of the book. However, any other type of information which can be correlated to a number system can be placed upon the motion picture film.

14 indicates an electric motor which drives a shaft 15 through a worm shaft and coacting gear 16. Gears 17 and 32 drive shaft 18 from shaft 15 and on shaft 18 is provided a pinion 19 which respectively drives gears 20 and 21 mounted on the same shafts which mount sprockets 9 and 11. In this manner sprockets 9 and 11 are driven by the motor 14 for passing the film 8 through the gate 10.

The shaft 15, which is driven by the motor 14, drives through gears 22 and 23 to a shaft 24. Gears 25 and 26 drive shaft 27 in turn from shaft 24.

On shaft 27 is mounted a small pinion 28 which drives a gear 29 bolted as indicated at 30 (Figure 6) to a rotor plate 31. Gear 26 on the shaft 27 also drives a pinion gear 33 bolted as indicated at 34 to a control plate 35. By these gear connections, therefore, the plates 31 and 35 are adapted to be driven simultaneously with the movement of the film 8 by the motor 14.

The rotor plates 31 and 35 are part of the film controlling mechanism 4. As illustrated most clearly in Figure 6, this mechanism includes an axle 36 upon which the control plates 31 and 35 are mounted for rotation by bearings 37 and 38 respectively. The rotor plate 31 is provided with a bracket mounting an electric circuit breaker 39, and the rotor plate 35 is provided with a bracket which mounts the electric circuit breaker 40.

Figure 6:
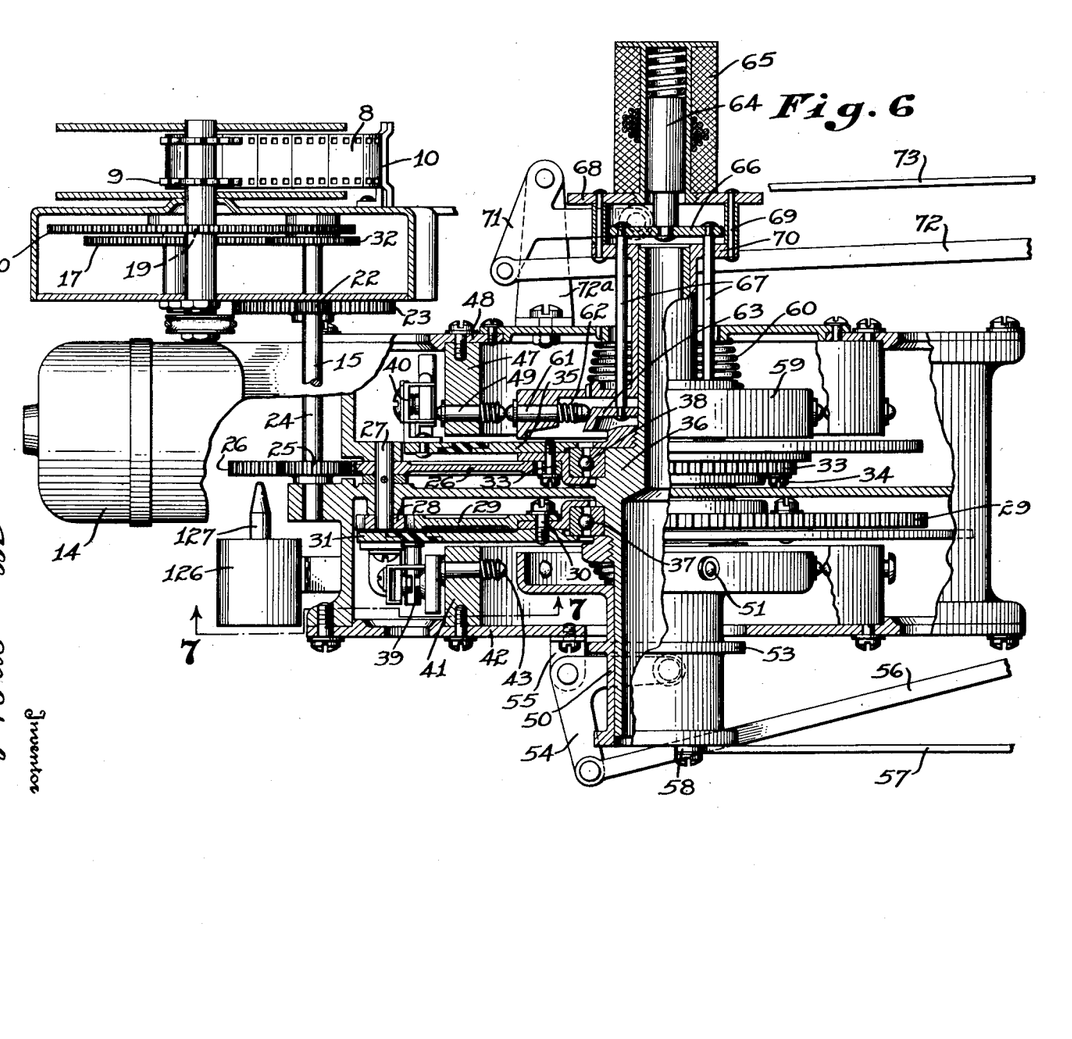
Figure 6 is a section on the line 6—6 of Figure 1.

The circuit breaker 40 comprises, as hereinafter explained, a stopping member for the driving means which drives the band of material, and the circuit breakers 39 and 40 constitute two control members driven in synchronism with the driving means of the band of material.

The outer portion of the control plates 31 and 35 are electrically isolated from the remainder of the plate in Fig. 6 so as to operate as slip rings for one side of the circuit breakers 39 and 40.

Figure 19:
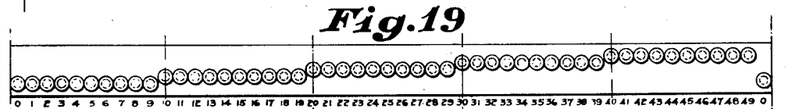
Figure 19 is a layout of one of the button positions.

Concentric with the axle 36 is provided a drum surface 41. This drum surface 41 is held in position by being bolted to a mounting plate 42, which in turn is bolted with the same casting as includes the axle 36. This drum surface mounts a plurality of sets of buttons 43, which are positioned to be engaged by one of the contacts of the circuit breaker 39. These buttons, as illustrated most clearly in Figure 19, are arranged in a plurality of sets, each set comprising a plurality of buttons spaced over an arc of the drum surface at intervals, spaced circumferentially. The different sets of buttons, as shown in Figure 19, follow each other circumferentially of the drum surface but are offset one from the other axially of the drum surface.

As illustrated in Figure 19, I have shown the drum surface adapted for use for displaying information correlated into a numerical system divided into degrees, minutes and seconds. In such a case each axially spaced apart set of buttons 43 corresponding to 10 degrees of the numbering system and it is sufficient to provide 5 different sets of buttons, the first set corresponding as numbered for clarity on Figure 19 to the degrees from 0 to 9, inclusive; the second set corresponding to degrees from 10 to 19, inclusive; the third set corresponding to degrees from 20 to 29, inclusive; the fourth set corresponding to degrees from 30 to 39, inclusive; and the fifth set corresponding to degrees from 40 to 49, inclusive.

Where the data is correlated to a number system divided decimally rather than degrees, minutes, seconds, etc. the number of different sets of buttons on the drum 41 should be increased 10 to correspond to the first figure of the numerical system utilized.

Figures 20, 21:
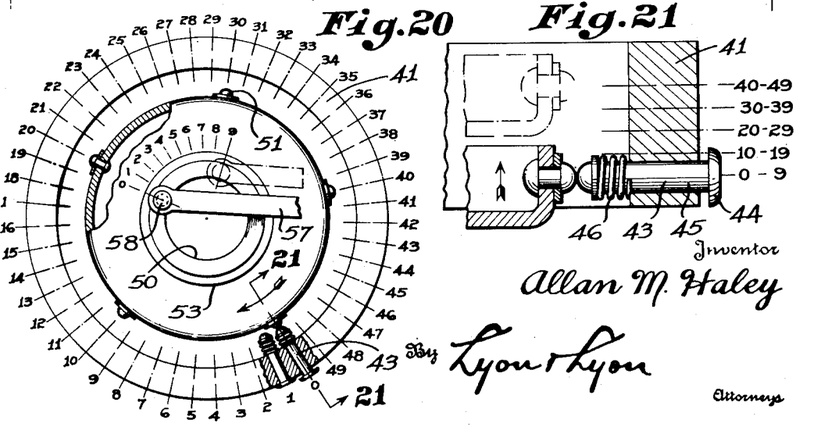
Figure 20 is an end view of the button mounting selector of Figure 19.
Figure 21 is a section on the line 21—21 of Figure 20.

As illustrated more specifically in Figure 21, each of the buttons 43, which is mounted on the drum 41, includes a contact head 44 and a shank 45 extending through the drum. At the rear surface of the drum each of the buttons 43 is provided with a spring 46 which yieldingly urges the head 44 into retracted position. The rear end of the shank 45 is provided however with a contact head intended as hereafter described for operation of control mechanisms for advancing the buttons.

There is also provided a second button drum 47 mounted coaxial with the axle 36 by mountings means 48. This drum has a set of buttons 49 similar to the buttons 43 previously described except that their heads are somewhat more rounded as indicated and are normally retracted radially by their springs. These buttons are positioned to contact the circuit breaker 40.

The buttons 49 are arranged on the drum 47 in a manner similar to that illustrated in Figure 19 and described in connection with the description of the buttons 43 except that on the drum 47 there are provided six axially spaced apart set of buttons, each set including 10 buttons so that each button can correspond to one minute of angle as hereafter more particularly pointed out. Where the information to be displayed was correlated to a decimal number system there would be on the drum 47 ten axially spaced apart sets of buttons rather than six.

To the rear of the buttons 43 is provided a selective button advancing mechanism which includes a selective button advance control or a selective operating member advance control 50 mounted on the axle 36 so as to control both a limited rotary and limited axial movement. This control 50 is provided with a set of contact members 51, one corresponding to each of the axially spaced apart sets of buttons 43 on the drum 41. These buttons 51 are positioned to contact the rear rounded surfaces of the buttons 43, only one of the buttons 51 being in contact with the buttons 43, depending upon the axial position of the control 50.

The control 50 is yieldably urged axially downward as viewed in Figure 6. For controlling the movement of the control 50 axially this control is provided with a circular flange 53 contacted by a roller on a bell crank 54 pivotally mounted by a bracket 55 on the plate 42. The bell crank 54 is in turn pivoted to an actuating rod 56, and leading to the keyboard mechanism 6 and operated as hereafter described.

For controlling the arcuate movement of the control 50 there is provided a rod 57 mounted tangentially to the control 50 by a pin 58 as indicated most clearly in Figure 20. The rod 57 also leads to the keyboard mechanism where its movements are controlled in a manner hereafter described. For selectively controlling the advancements of the buttons 49 mounted on the drum 47 there is provided the selective button advance control or operating member advance control 59 which is likewise mounted on the axle 36 for a limited rotary and a limited axial movement. This control is yieldingly urged axially downwardly as viewed in Figure 6 by the spring 60. The control mounts six buttons 61, one corresponding to each of the six axially spaced apart sets of buttons 49. The buttons 61 are spaced circumferentially of the control 59. These buttons 61 are mounted for radial movement relative to the member 59 by being normally yieldingly moved towards a retracted position by spring 62. When brought into an advancing position only one of the six buttons 61 is in cooperative contact with one of the axially spaced apart sets of buttons 49, the particular button 61 cooperating with the particular set of buttons 49, depending on the axial position of the control 59.

For simultaneously advancing all of the buttons 61 there is provided a beveled cam member 63. The cam 63 is mounted for axial movement on the shaft 36. In Figure 6 it is shown in the position where it is engaging the buttons 61 to move the buttons to an advanced position. When moved downwardly as viewed in the figure, it allows the buttons 61 to retract so they cannot contact any of the buttons 49.

The axial movements of the cam 63 are controlled by an armature 64 operated by solenoid 65. For this purpose the armature 64 is indicated as attached to a plate 66 connected by rods 67 to the cam 63. The solenoid 65 is indicated as mounted on a plate 68 which is supported above by rods 69 from a flange 70 of the control 59. For controlling the axial movement of the control 59 there is provided a bell crank 71 pivotally mounted by the bracket 72ᵃ. This bell crank is provided with a roller engaging the plate 68 and is pivoted to an operating rod 72, the other end of which leads to the keyboard mechanism 6, by means of which the motions of the rod and axial movement of the control 59 are controlled as hereinafter described. There is also provided the control rod 73 attached in a tangential manner to the plate 68 so that it may regulate the arcuate movement of the control 59. This rod also extends to the keyboard mechanism 6 where its motions and the arcuate movements of the control 59 are controlled as hereafter described.

Figure 10:
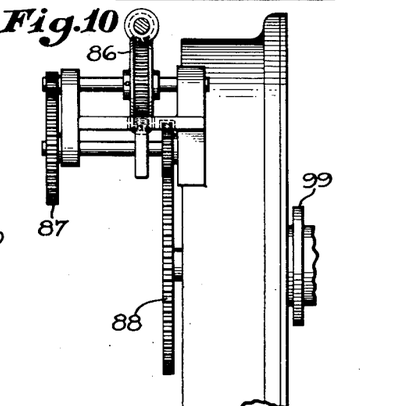
Figure 10 is a section on the line 10—10 of Figure 8.
Figures 11, 12, 13, 14, 15, 16, 17:
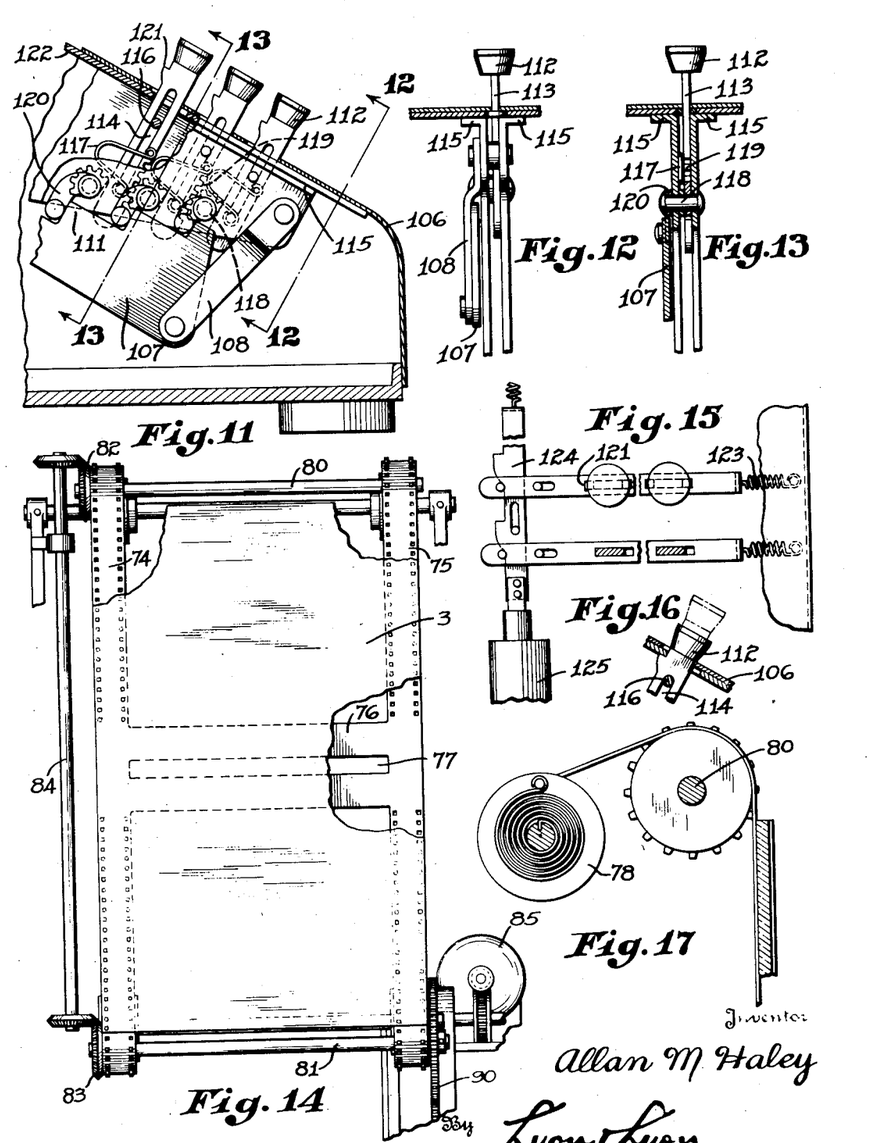
Figure 11 is a fragmentary section on the line 11—11 of Figure 4.
Figure 12 is a fragmentary section on the line 12—12 of Figure 11.
Figure 13 is a fragmentary section on the line 13—13 of Figure 11.
Figure 14 is a front view, partially in section, of the view screen.
Figure 15 is a diagrammatical view of the trip mechanism for the keys.
Figure 16 is a fragmentary section illustrating one of the keys in a locked position.
Figure 17 is a fragmentary section on the line 17—17 of Figure 4.

Referring more particularly to Figures 1, 10 and 14, the masking mechanism comprises a pair of driving tapes 74 and 75 arranged to be moved vertically along the side edges of the screen 3. The tapes 74 and 75 are connected by the masking member 76 which has a slot 77 which is used in the present invention for marking out from a particular scene projected on the screen 3 a particular portion, or line of figures on that screen which is to be read and corresponding to the setting of the keyboard mechanism as hereafter pointed out. Each of the tapes 74 and 75 has its upper end mounted on a reel 78 and its lower end wound around a reel 79 and adapted to be driven upwardly and downwardly for moving the masking member over the screen 3. For this purpose the tapes are provided with sprocket holes and driven by sprockets mounted at the upper ends on a rod 80, and sprockets on the lower end of the screen by a rod 81. The rods 80 and 81 are provided with gears 82 and 83, respectively, which are geared as indicated in Figure 14 to a shaft 84 for synchronizing the movements of these sprockets.

There is provided a motor 85 having a worm drive through a set of gears 86, 87 and 88 to a gear 89 which drives a gear 90 mounted on the lower shaft 81 and by means of which the tapes

Figure 5:
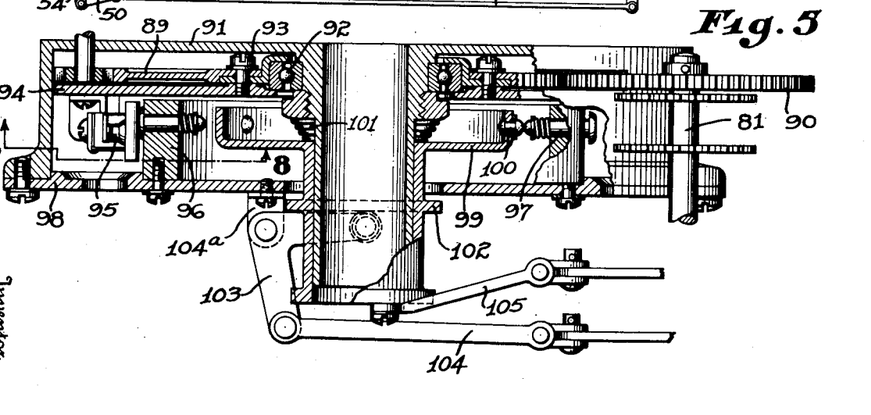
Figure 5 is a section on the line 5—5 of Figure 1.

74 and 75 may be driven. The gear 89 as indicated in Figure 5 is a part of the controlling mechanism which includes a body member 91 having a portion serving as an axle. The gear 89 is mounted by a bearing 92 on this axle and is bolted as indicated at 93 to a control plate 94. This control plate 94 has a bracket mounting a circuit breaker 95. This circuit breaker 95 is positioned for cooperation with the drum 96 mounted on a plate 98 fastened to the body 91 and coaxial with the axis of said body.

Said drum 96 is provided with buttons 97 similar in construction to the buttons 43 and these buttons are distributed on the drum 96 in sets in a manner similar to that described in connection with Figure 19. In this particular case there are six sets of 10 buttons each axially offset from each other on the drum 96. To the rear of these buttons is provided the control member 99 which is mounted on the axle in order to undergo a limited rotary motion and a limited axial motion. This member 99 is provided with buttons 100, there being six in number, one corresponding to each of the sets of buttons 97 and positioned circumferentially spaced around the member 99. Only one of the buttons 100 is in position to contact the buttons 97 depending upon the axially shifted position of the member 99. The member 99 is yieldingly urged axially downward as viewed in Figure 5 by the spring 101.

The member 99 is provided with a circular flange 102 engaged by a roller on a bell crank 103 pivoted a bracket 104ᵃ attached to the plate 98. The bell crank is also attached to rod 104, the other end of which leads to the keyboard mechanism 6 by which the rod 104 is actuated in order to shift the control member 99 axially. There is also attached a rod linkage 105 to the control member 99 at a tangential position so that the movement of this control linkage is capable of rotating the control member through an arc, the other end of this control linkage 105 also leading to the keyboard mechanism.

Figure 4:
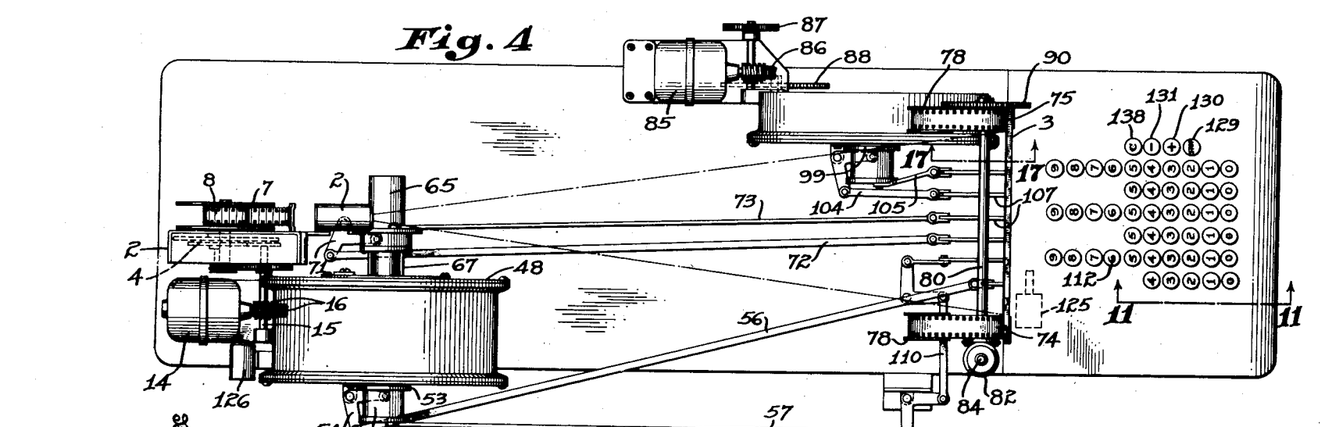
Figure 4 is a plan view.

The keyboard mechanism comprises a front plate 106, from which protrude the operating buttons of the keys. Referring to Figure 4, these keys consist of a lower row of keys marked with numerals 0 to 4, inclusive, which are intended to control the movement of rod 56. A second row of keys marked from 0 to 9, inclusive, is intended to control the motion of the rod 57; a third row of keys marked from 0 to 5, inclusive, is intended to control the operation of the rod 72; the fourth row of keys marked 0 to 9, inclusive, is intended to control the motions of the rod 73; the fifth row of keys marked 0 to 5, inclusive, are connected for operation of the rod 104, and a sixth set of keys labeled from 0 to 9, inclusive, is intended for operating the rod 105. There are also provided keys 129, 130, 131 and 138.

Below the keys there is provided a number of actuating plates 107, each of which is suspended at its opposite ends by links 108 and 109 pivoted to the brackets depending from the plate 106 (Figure 1). There is one of such actuating plates connected as shown particularly in Figure 4 to each of the rods 56, 57, 72, 73, 104 and 105. In the particular form of the invention shown in Figure 4 additional connecting linkage such as indicated at 110 is used for connecting the rod 57 with its actuating plate 107 merely because of the space requirements. Each of the actuating plates 107 is provided with a stepped surface such as indicated at 111, the number of steps provided on the particular actuating plate 107 corresponding to the number of keys in the row of keys intended to operate said actuating plate. In Figure 1 ten of such steps are indicated, the particular actuating plate 107 being therefore suitable for operation with either the second, fourth or sixth row of keys as viewed on Figure 4, it being understood that the actuating plate for the first row of keys would need only five steps, the actuating plate for the third row of keys would need only six steps, etc.

For operating the actuating plates from the keys as illustrated most clearly in Figures 11, 12 and 13, each key is shown as consisting of a button 112 on the end of a plate 113, having an elongated slot 114. The plate 113 of the key extends between two spaced apart bracket members 115 which carry spaced apart pins 116 for longitudinally guiding the keys. To one of the pins 116 is fastened one end of a coil spring 117, the other end of which is attached to the key and acts to normally urge the keys upwardly on to the release position. The brackets 115 also mount pins 118 which serve as shafts for sector gears which mesh with rack teeth 119 formed on the plates 113 of the keys. These sector gears are rigid with arms 120 which are in engagement with the steps of the actuating members 107. With this construction, when one of the keys is pressed downwardly its corresponding arm 120 is rotated to engage the actuator 107, urging said member to the right as viewed in Figure 2 and thereby moving the rod connected thereto. The extent of movement depends on the length of the arm, arms of increasing length being provided for the progressively higher number of keys.

Each of the keys is provided with a shoulder such as indicated at 121, which will serve to latch the key downwardly when depressed against a release bar 122. A single release bar extends under all of the keys in any one row having an opening corresponding to each key. Such release bars are yieldingly urged to locking position by springs 123 as shown in Figure 15. The release bars are all connected to a release member 124 actuated by a solenoid 125.

In operation of the apparatus of the present invention the operator is merely required to press the particular key corresponding to the number or the angle of the frame of the film which is to be exhibited. For example, when the apparatus is set up to display trigonometric functions as in the example given and it should be desired to have displayed the particular frame of the film corresponding to 23°, 14′, and have located on the screen a portion of the projected scene giving the angle corresponding to 36″, the No. 2 key of the lower row of keys as viewed in Figure 1 is pressed and the No. 3 key pressed to correspond to the 23° desired, the No. 1 key in the third row and the No. 4 key in the fourth row are pressed corresponding to the 14′, and the No. 3 key in the fifth row and the No. 6′ key in the sixth row are pressed corresponding to the 36″ in question.

The pressing of the No. 2 key of the first row moves the operating lever 56 the proper distance to axially shift the control member 50 so as to bring its proper button 51 into contact with the third set of ten buttons as viewed in Figure 19 (the one containing the No. 23 button). The pressing of the No. 3 key in the second row moves the rod 57 the proper distance for rotating the member 50 to bring one of the buttons 51 into contact with the No. 23 button of the series of buttons 43 whereby this button only is moved into an advance position relative to the drum surface 41. The circuit breaker 39 is rotated relative to the drum surface 41 (it being driven by the projector motor 14 as previously described) until it contacts the particular raised button 43, whereupon the contacts of the circuit breaker are closed. The closing of the contacts of the circuit breaker 39 energizes the solenoid 65 (through circuits hereafter described in connection with Figure 18). Energizing the solenoid 65 causes the button 61 of the control 59 to be advanced to the operating position. By this time the projector motor has driven the film through the projector until there is present at the gate of the projector the different frames of film upon which are photographed the functions of angles of 23° and the machine is ready for the selection of the particular frame which corresponds to the 23°, 14'. The button 61 must be maintained retracted until the film has been driven to this zone of operation. The pressing of the No. 1 key in the third row of keys has moved the operating rod 72 into position to axially shift the control 59 so that the buttons 61 are axially aligned with the set of ten buttons 49 which contain the Number 14 button. Likewise the pressing of the No. 4 key in the fourth row has moved the operating rod 73 so as to rotate the control 59 so that it will be the No. 14 button 49 which is actually in contact with the button 61. Therefore, this button which corresponds to an angle of 14' will be advanced relative to the drum surface 47.

When the motor which is driving the film has driven the film to bring that frame of film in register with the gate of the projector, which frame contains the data corresponding to 23° 14', the circuit breaker 40 contacts this projected button 49 to open the circuit which has to this time been maintained closed by the circuit breaker 40. This circuit as hereafter described in connection with Figure 18 cuts the power to the projector motor 14 so as to stop the film. Simultaneously as hereafter described, a solenoid 126 is deenergized to permit its plunger 127 (Figure 6) to enter into one of a plurality of openings 128 which are provided in gear 26 (see Figure 7), which has the effect of instantly stopping the movement of the film with the proper frame in register in position to be projected. This results in there being projected upon the screen 3 the trigonometric data corresponding to 23° and 14'.

In order that the particular data on the scene so projected which corresponds to the angle of 36" may be automatically indicated, the action of pressing key No. 3 in the fifth row (see Figure 4) functions to move rod 104 the proper distance for axially shifting the control member 99 so as to bring one of its buttons 100 in contact with the set of buttons 97 which corresponds to angles from 30 to 39" inclusive. Similarly, the pressing of the No. 6 button in the sixth row as viewed in Figure 4 has moved the rod 105 into position to rotate the control member 99 so the button corresponding to 36", which is actually engaged by one of the buttons 100 and whereby this particular button only is advanced from the drum surface 96 (Figure 5).

The motor 85 drives the indicating or mask member 76 until the particular data corresponding to 36" is located within the opening 77 of that indicating member (Figure 14), whereupon circuit breaker 95 (Figure 5) contacts the exposed button 97 breaking the circuit to motor 85. The operator is then able to read as particularly framed by the slot 77 the trigonometric functions which correspond to the particular angle 23°, 14' and 36" given in this example of an operation of the apparatus of the present invention.

Figure 8:
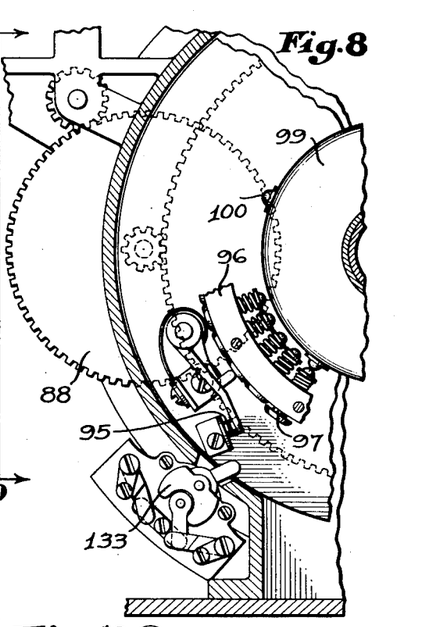
Figure 8 is a fragmentary section on the line 8—8 of Figure 5.
Figure 9:
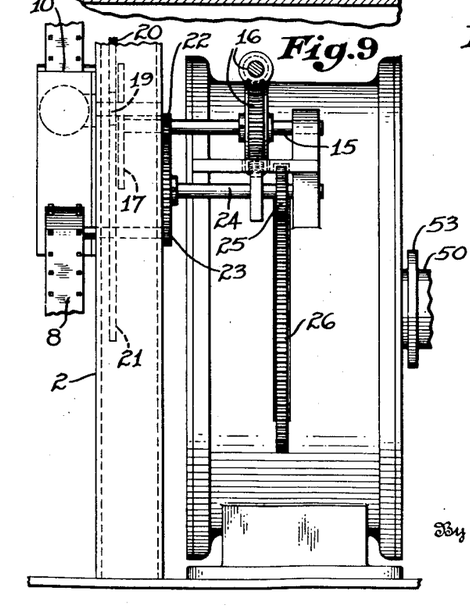
Figure 9 is a section on the line 9—9 of Figure 7.
Figure 18:
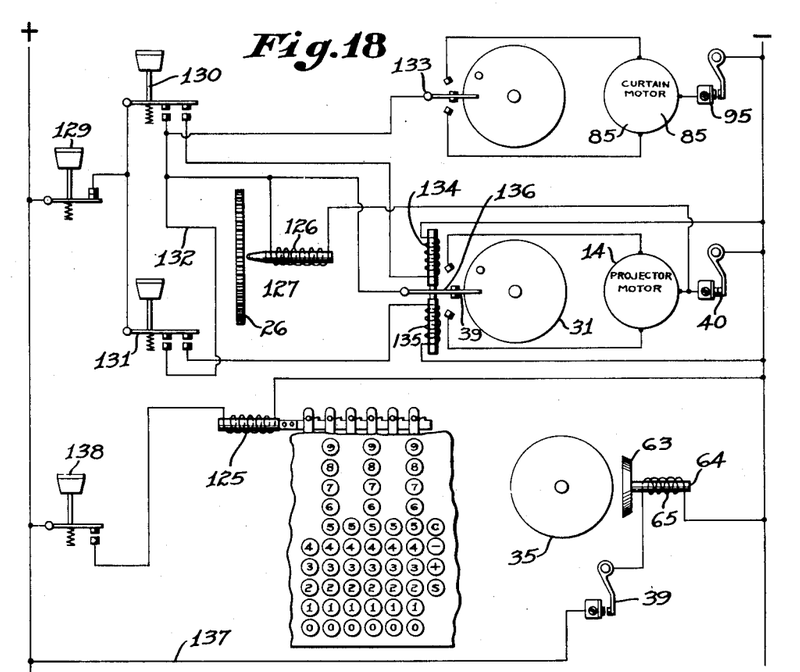
Figure 18 is a wiring diagram of the electric control circuits.

Now referring to Figure 18, the electrical control circuits are there illustrated. From the positive main a circuit leads through the stopbutton 129, which may be depressed to render inoperative the apparatus. The stopbutton 129 is connected to a plus button 130 and to a minus button 131, each of which has two sets of contacts. One of the contacts of each button 130 and 131 is connected by a line 132 to the moving contact of the reversing switch 133. This reversing switch, as illustrated in Figure 8 of the drawings, is positioned to be contacted by the circuit breaker 95 when the masking member 76 reaches either the top or bottom of the screen 3, reversing the connection between the moving contact and the two stationary contacts illustrated in Figure 18. In this way, when the curtain motor 85 drives the curtain or mask to one extremity of its operation, the motor is automatically reversed. From motor 85 the circuit breaker contact 95 leads through to the negative main. Thus, on depressing either the plus or minus buttons 130 and 131 (provided the stop button 129 has not been depressed) a circuit is established to the curtain motor 85, driving this motor one way or another until the contacts of the circuit breaker 95 are opened, as previously described.

Magnet 126 is also indicated as connected to the line 132 and leads hence to the circuit breaker 40 to the minus line so that the magnet is energized to withdraw the plunger 127 whenever either of the keys 130 and 131 is depressed. The second contacts operated by keys 130 and 131 are respectively connected to the solenoids 134 and 135 which move a reversing switch 136 for the projection motor 14 so that when the button 130 is pressed the projection motor will be driven in one direction and when the button 131 is depressed it will be driven in the opposite direction. By closing the proper button to start the operation of the machine the operator assures that the motor will drive the film only through the minimum passage necessary to bring the desired frame into registry with the lens 5.

Figure 7:
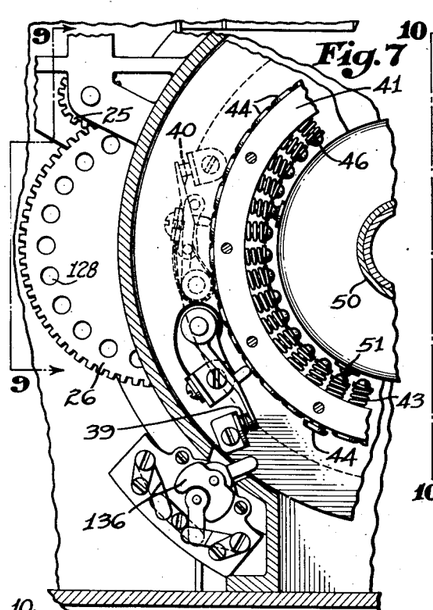
Figure 7 is a fragmentary section on the line 7—7 of Figure 6.

The reversing switch 136 is of a type adapted to be actuated by its solenoids 134 and 135, but as illustrated in Figures 7 and 18, it has a movable arm by which it is adapted to be reversed by contact with that arm of the circuit breaker 39 when the film in the projector reaches one intended limit of its movement. Accordingly, if the wrong button 130—131 is pressed for starting the motor 14, the motor will drive the film to the end and then automatically reverse itself and continue until it brings the proper frame into position to be projected by the projector.

In Figure 18 a circuit is shown from the plus lead through line 137 to the circuit breaker 39, from hence the circuit leads to the solenoid 65, which operates the armature 64 connected to the button cam 63. The release button 138 is shown as provided with a contact which, when closed, establishes a circuit to the solenoid 125, which resets all of the keys of the machine. In this action keys 130 and 131 are reseated to open all their contacts and circuit breakers 40 and 95 are closed because of the retraction of the buttons which close these circuit breakers when the keys on the keyboard machine are withdrawn.

While the particular form of the apparatus herein described is well adapted to carry out the objects of the invention, various modifications and changes may be made and this invention includes such modifications and changes as come within the scope of the appended claims.

I claim:

1. In an apparatus of the class described, a mounting member having means defining an axis, a plurality of groups of operating members mounted on said mounting member generally concentrically about said axis, each of said groups being axially offset from the other groups, each of said groups comprising a plurality of operating members spaced circumferentially about said axis, means mounting each of said operating members on said mounting member for limited movement relative thereto, means mounting a control for rotation about said axis and for sliding movement therealong, said control having means adapted to engage a selected operating member and move the same through said limited movement, manually operable key means arranged to slide said control to a desired position along said axis to select a desired group of said operating members, and further manually operable key means arranged to rotate said control about said axis to engage and move a selected operating member of said desired group.

2. In an apparatus of the class described, a circuit breaker, means mounting said circuit breaker on a supporting structure for movement along a predetermined path relative to said structure, means mounting a plurality of members on said supporting structure for individual movement into said path for actuating said circuit breaker, said members being arranged in sets spaced apart in one direction transversely of said path, each set comprising a plurality of members spaced apart in another direction generally parallel to said path, means for driving said circuit breaker along said path, a control for moving a selected one of said members into said path, said control being movably mounted on and selectively shiftable relative to said supporting structure in said two directions for selecting and moving said selected member, a first set of keys arranged to shift said control in one direction, and a second set of keys arranged to shift said control in the other direction.

3. In an apparatus of the class described, means defining a cylinder, a circuit breaker, means mounting said circuit breaker for rotation about said cylinder, means mounting a plurality of members on said cylinder for radial movement thereon, said circuit breaker being arranged to be actuated when rotated to a position adjacent a selected radially moved member, the members being arranged in sets spaced axially on said cylinder, each set including a plurality of circumferentially spaced members, means mounting a control for movement axially of said cylinder and for rotation about the axis thereof for selecting a member to be moved radially, a first set of keys arranged to axially move said control, and a second set of keys arranged to rotate said control.

4. In an apparatus of the class described, a circuit breaker, means mounting said circuit breaker on a supporting structure for movement along a predetermined path relative to said structure, means mounting a plurality of members on said supporting structure for individual movement into said path for actuating said circuit breaker, said members being arranged in sets spaced apart in one direction transversely of said path, each set comprising a plurality of members spaced apart in another direction generally parallel to said path, means for driving said circuit breaker along said path, a control for moving a selected one of said members into said path, means mounting said control on said structure for selective shiftable movement relative to said structure in said two directions for selecting and moving said selected member, a first set of keys arranged to selectively shift said control in one direction, and a second set of keys arranged to selectively shift said control in the other direction, said control having a plurality of spaced member-engaging contacts, and means for simultaneously moving said contacts relative to said control in a direction transverse to said path.

5. An apparatus as defined in claim 4, wherein said last-named means comprises a solenoid.

6. In an apparatus of the class described, means defining a cylinder, means mounting a circuit breaker for rotation about said cylinder, means mounting a plurality of members on said cylinder for radial movement thereon, said circuit breaker being actuated when rotated to a position adjacent a selected radially moved member, the members being arranged in sets spaced axially on said cylinder, each set including a plurality of circumferentially spaced members, means mounting a control for movement axially of said cylinder and rotatably about the axis thereof for selecting a member to be moved radially, a first set of keys arranged to axially move said control, and a second set of keys arranged to rotate said control, said control including a member-engaging contact mounted thereon for movement in a radial direction into and out of member-engaging position.

7. In an apparatus of the class described, means defining first and second cylinders, means mounting first and second circuit breakers rotatably, respectively, about said first and second cylinders, means mounting a plurality of members on each of said cylinders for radial movement thereon, each of said circuit breakers being actuated when rotated to a position adjacent a radially moved member of a corresponding cylinder, the members of each cylinder being arranged thereon in sets spaced axially of the cylinder, each set comprising a plurality of circumferentially spaced members, means mounting first and second controls for movement, respectively, axially of said first and second cylinders and rotatably about the axes thereof, each of said controls including a member-engaging contact for radially moving a selected member of its corresponding cylinder, the member-engaging contact on said second control being movable thereon from a non-member-engaging to a member-engaging position, and key control mechanisms arranged to selectively move said controls axially and rotationally.

8. In an apparatus of the class described, first and second circuit breakers, means mounting each of said circuit breakers on a supporting structure for movement along respective predetermined paths relative to said structure, a group of operating members mounted on said structure adjacent each path and spaced apart along said path, means arranged to selectively move a member from each group into its adjacent path whereby to actuate the corresponding circuit breaker as it moves therepast, means for moving said first circuit breaker along its path at a relatively low speed and for moving said second circuit breaker along its path at a relatively high speed, key control mechanism arranged to selectively move one of said operating members into said first path, key control mechanism arranged to select a member for movement into said second path, and means controlled by said first circuit breaker, when actuated, to move said selected member into said second path.

ALLAN M. HALEY.

References Cited in the file of this patent

UNITED STATES PATENTS

| Number | Name | Date |
|---|---|---|
| 1,746,704 | Koch | Feb. 11, 1930 |
| 1,881,757 | Long et al. | Oct. 11, 1932 |
| 1,889,575 | Sebille | Nov. 29, 1932 |
| 2,027,026 | Dirkes et al. | Jan. 7, 1936 |
| 2,121,061 | Townsend | June 21, 1938 |
| 2,223,334 | Robinson | Nov. 26, 1940 |
| 2,282,029 | Bryce | May 5, 1942 |
| 2,323,372 | Bryce | July 6, 1943 |
| 2,401,612 | Carrington | June 4, 1946 |